United States Patent
Ripoll-Ensenat et al.

(10) Patent No.: US 6,680,880 B1
(45) Date of Patent: Jan. 20, 2004

(54) APPARATUS FOR REPRODUCING INFORMATION FROM DATA-CARRYING DISKS

(75) Inventors: Noel Ripoll-Ensenat, Hasselt (BE); Bart Franco, Hasselt (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/706,672

(22) Filed: Nov. 6, 2000

(30) Foreign Application Priority Data

Nov. 12, 1999 (EP) .............................. 99203797

(51) Int. Cl.⁷ ............................................. G11B 7/085
(52) U.S. Cl. .................. 369/30.16; 569/30.15
(58) Field of Search ............................ 369/53.32, 53.1, 369/53.24, 30.1, 30.15, 30.16

(56) References Cited

U.S. PATENT DOCUMENTS

| | | | | |
|---|---|---|---|---|
| 4,630,250 A | * | 12/1986 | Nonomura ................ | 369/30.15 |
| 4,689,778 A | * | 8/1987 | Miura et al. ............. | 369/30.16 |
| 4,841,504 A | * | 6/1989 | Yamaguchi et al. ..... | 369/30.16 |
| 4,845,697 A | * | 7/1989 | Giddings ............. | 369/53.29 X |
| 4,847,708 A | * | 7/1989 | Furuyama ................ | 369/30.12 |
| 5,351,226 A | | 9/1994 | Mizumoto et al. ............ | 369/47 |
| 5,394,383 A | * | 2/1995 | Hira .......................... | 369/30.1 |
| 5,471,441 A | * | 11/1995 | Nonaka et al. ................ | 369/32 |
| 5,706,261 A | * | 1/1998 | Udagawa .................. | 369/30.03 |
| 5,920,526 A | * | 7/1999 | Udagawa ............. | 369/44.28 X |
| 5,982,727 A | * | 11/1999 | Kondo et al. ............ | 369/53.34 |
| 6,219,309 B1 | * | 4/2001 | Kuroda et al. ................ | 369/32 |

FOREIGN PATENT DOCUMENTS

| | | | | |
|---|---|---|---|---|
| EP | 0552986 A2 | 7/1993 | ........... | G11B/27/10 |
| EP | 0837473 A2 | 4/1998 | ........... | G11B/27/10 |

\* cited by examiner

*Primary Examiner*—Aristotelis M. Psitos
(74) *Attorney, Agent, or Firm*—Michael E. Belk

(57) ABSTRACT

CD playback apparatus for reproducing information from unfinalized CD-R disks which have no index information stored in a table of contents (TOC) area which scans a disk coarsely to detect the end of the recorded area approximately and scans the disk finely in the area of the detected approximate end, to detect the end of the recorded area with greater accuracy. The apparatus has an optical pick-up unit which jumps across a disk with predetermined intervals, to detect partial index information for the disk during the coarse scanning, analyses the partial index information, performs the fine scanning, jumps to an area in which missing index information is judged to exist as a result of the analysis, and reads out data in the jumped-to area to detect the missing index information.

18 Claims, 3 Drawing Sheets

US 6,680,880 B1

APPARATUS FOR REPRODUCING INFORMATION FROM DATA-CARRYING DISKS

BACKGROUND OF THE INVENTION

1. Technical Field

This invention relates to apparatus for reproducing information from data-carrying disks having recorded areas of varying size and/or characteristics.

2. Related Art

Conventional Compact Disk (CD) players are well known. A CD disk, arranged in accordance with the so-called "red book" standard, includes an area carrying playback data and a table of contents (TOC) area carrying index information for the recorded area. The TOC information indicates the various playback track start points and total playing time of the recorded area. In order to play back the CD, a conventional CD player first accesses the TOC area and reads the index information therefrom, before accessing and playing back from the recorded area.

CD-recordable (CD-R) writer/players are also well known. A CD-R disk may be recorded over once, and only once, although it may be recorded in stages. A partially-recorded CD-R disk is referred to herein as an unfinalized CD-R. A specific finalizing process is required in order to convert the CD-R disk into a finalized disk which may be played back in a conventional CD player. A CD-R disk, arranged in accordance with the so-called "orange book" standard, includes a recorded area corresponding to the playback area of the CD disk and referred to as a program area (PA), a TOC area which generally remains unwritten until the disk is finalized, and a program memory area (PMA) which contains index information even when the disk is unfinalized, which information is written in the TOC area when the disk is finalized. The PMA is located in an inner part of the disk, which is inside any recording area specified in the "red book" standard, and therefore many conventional CD players cannot access this area. Furthermore, the PMA is located in an area of an unfinalized CD-R in which no data is recorded, other than the PMA. The CD-R includes a pre-groove which can be detected by a CD-R writer/player, but not a conventional CD player. The pre-groove includes ATIP (absolute time in pre-groove) information, whereby the location of the PMA may be detected by a CD-R writer/player. The ATIP consists of a frequency modulated wobble of the pre-groove. Because a conventional CD player cannot detect the pre-groove, the ATIP information cannot be accessed, and therefore the location of the PMA cannot be readily determined.

Since the index information, which is otherwise read from the PMA, is necessary for playback, unfinalized CD-R disks generally cannot be played back by conventional CD players.

A solution to this problem is to provide the conventional CD player with the necessary means to reach the PMA, to detect the pre-groove and to read the ATIP. However, such a solution is not cost-effective.

U.S. Pat. No. 5,351,226 to Mizumoto et al., entitled Method and apparatus for reproducing information from a recordable optical disc regardless of whether an index area is detected as being present on the disk and a method of generating index information during reproduction of the information on the disk, describes a CD player which is capable of playing back unfinalized CD-R disks. In this arrangement, the index information is built up before a disk is played back by scanning the recorded area of the CD-R. A radial scan of the recorded area is carried out to detect a high frequency signal, which ends when the end of the recorded area is reached. The apparatus then jumps into the end track of the recorded area, reads sub-code information therefrom, wherefrom the relative time within the end track is ascertained, and a further jump to the start of the end track is used to read out further sub-code information for the end track. Next, sub-code data is read out from the penultimate track, and each of the preceding tracks in turn, in order to build up the index information. In this way, the unfinalized CD-R can still be played back, even though there is no index information recorded in the TOC area of the disk, and even though the CD player is not able to access the PMA.

The process of building up index information by scanning the disk should preferably be relatively short, since it is undesirable for a user to have to wait long periods before an unfinalized CD-R can be played back.

On the other hand, the index information should desirably be accurate. For example, a high degree of accuracy in the determination of the total playing time of the recorded area is desired. The reason for this may not be immediately apparent, insofar as an unfinalized disk may be played back fully even if the total playing time is not known to within a great deal of accuracy (for example, ±5 seconds). However, the total playing time is important if the disk is to be copied. If, for example, it is known that a disk onto which the copying is to be performed has a total blank area equal to the total playing time, a user will expect that the information on the disk to be copied can be accommodated therein. However, if the total playing time is incorrect, a part of the information to be copied may be lost. Furthermore, the index information built up in the scanning method may be used to prepare the TOC on the recorded disk, in which case such information will also be incorrect, and further recording problems may also occur.

In U.S. Pat. No. 5,351,226, cited supra, it is estimated that the end of the recorded area is detected to within 20 data track crossings. This corresponds to approximately 2½ to 6 seconds of playing time, depending on the radial location of the end of the recorded area (with a constant linear velocity (CLV) system the amount of playing time per track crossing increases as the recorded area increases in size towards the outer periphery of the disk). It would be desirable to detect the end of the recorded area with a greater degree of accuracy.

SUMMARY OF THE INVENTION

In accordance with one aspect of the invention there is provided apparatus for reproducing information from data-carrying disks having recorded areas of varying size, wherein said apparatus comprises scanning means arranged to:

scan a disk coarsely to detect the end of a recorded area approximately; and scan the disk finely in the area of the detected approximate end, to detect the end of the recorded area with greater accuracy.

The apparatus of the invention is thus able to detect the end of a recorded area relatively quickly, and with a desired degree of accuracy.

In accordance with a further aspect of the invention there is provided apparatus for reproducing information from data-carrying disks having recorded areas of varying characteristics, wherein said apparatus comprises scanning means for reading out data from the recorded area of a disk in order to detect index information for the disk, said scanning means being arranged to:

jump across a disk with predetermined intervals, to read out data at said predetermined intervals to detect partial index information for the disk, to analyze said partial index information, to jump to an area in which missing index information is judged to exist as a result of said analysis, and to read out data in said jumped to area to detect said missing index information.

The apparatus of the invention is thus able to detect at least partial index information whilst a scanning algorithm including jumps at predetermined intervals is carried out, thereby reducing the amount of time in which all the desired index information may be built up. To complete the desired index information, only the missing index information is then required.

Preferably, the size of the recorded area is still to be detected whilst the scanning means jumps across the disk with the predetermined intervals. Accordingly, at least an approximate size of the recorded area may be determined by means of the jumping with predetermined intervals, at the same time as the partial index information is detected.

BRIEF DESCRIPTION OF THE DRAWINGS

Further features and advantages of the present invention will become apparent by reference to the following description of a preferred embodiment of the invention, which is given by way of example only, made with reference to the accompanying drawings, wherein.

DETAILED DESCRIPTION OF THE EMBODIMENTS

Figure 1:
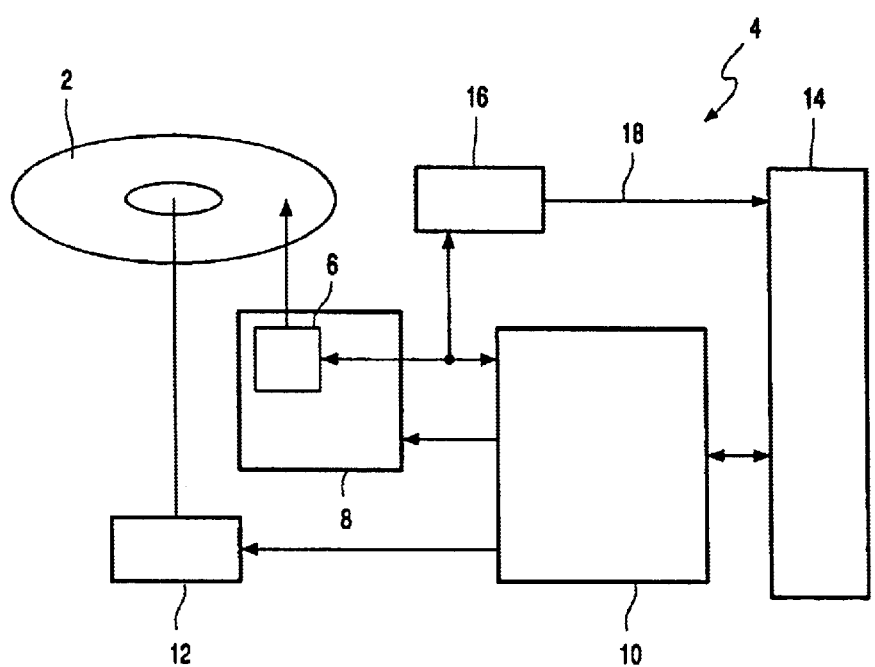
FIG. 1 is a schematic illustration of a CD player in accordance with an embodiment of the invention.

FIG. 1 illustrates a CD-R 2 being played back in a CD player 4 in accordance with this embodiment of the invention. The CD player 4 includes an optical pick-up unit 6, whereby information is optically detected by a laser beam reflected from an information layer in the disk 2. The optical pick-up unit 6 is located on a radial sledge mechanism 8, whereby the optical pick-up unit 6 is scanned radially across the disk 2. A high frequency (HF) decoder and servo-control unit 10 decodes high frequency electronic signals output generated by the optical pick-up unit 6, and controls the radial position of the sledge 8. In addition, the decoder and control unit 10 performs a servo control function for a spindle motor 12, whereby the speed of rotation of the disk 2 is regulated. A processor unit 14 processes the data emanating from the decoder and control unit 10, controls overall operation of the CD player 4 in accordance with information input by the user, and outputs a useful data signal to be used for example by a computing device or an audio playback device.

Figure 5:
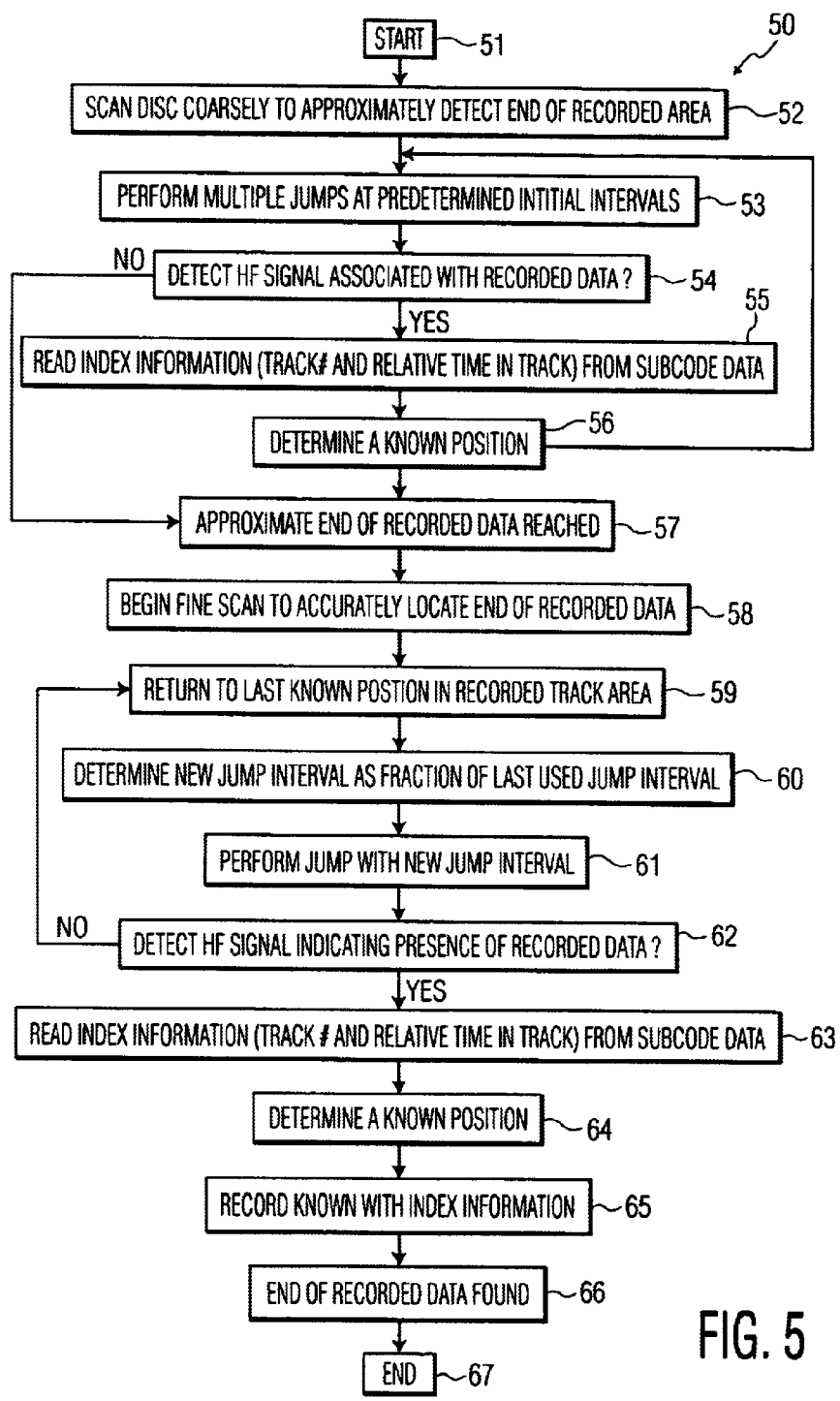
FIG. 5 is a flow chart showing the sequence of search operations according to the present invention.

Referring to FIG. 5, a flow chart 50 is depicted which illustrates the sequence of search operations for locating for the end of a previously recorded area the adjacent unrecorded area, according to one embodiment of the present invention. Following initial step 51, a first, coarse, scanning process begin at step 52 to approximately detect the end of the recorded area. The course scanning process begins at the state of a recorded area, and a series of jumps are performed as in step 53. Each jump is of a predetermined initial interval. At the end of each jump, the presence or absence of the HF signal is detected as in step 54. The presence of the HF signal indicates that the location contains recorded data. Conversely, the absence of the HF signal indicates that there is no data recorded at the location.

If the HF signal is detected, the coarse scanning process continues to step 55 where index information (including the track number, and the relative time in the track, are recorded). This index information permits a known position to be determined (step 56) and the process returns to step 53 where another series of jumps is performed.

If the HF signal is not detected, the coarse scanning process advances to step 57, wherein it is assumed that the approximate end of the recorded data has been reached.

Continuing to step 58, a fine scanning process is initiated to more accurately locate the end of the recorded area than is possible via the coarse scanning process. In the first step of the fine scanning process, step 59, the sledge 8 (FIG. 1) is moved to the last known position in the recorded track area. Then in step 60, a new jump interval is determined which is a fraction (e.g., one-half) of the predetermined jump interval used in the coarse scanning phase. In step 61, jumps are performed with the new jump interval. In step 62, the presence or absence of the HF signal is detected.

If the HF signal is detected, the fine scanning process continues to step 63 where index information (including the track number, and the relative time in the track, are recorded). This index information permits a known position to be determined (step 64).

If the HF signal is not detected, the coarse scanning process advances to step 59, wherein it is assumed that the approximate end of the data has been reached. Then, a new jump interval is determined in step 60, and the fine scanning process continues until the HF signal is detected in step 62.

Once a known position is determined in step 64, the index information associated with the known position is recorded (step 65) and the end of the recorded data is thus located (step 66). Step 67 indicates the end of the search operations.

The CD player 4 in accordance with this embodiment of the invention also includes a high frequency (HF) detector 16, which receives an output from the optical pick-up unit 6 whilst the pick-up unit is reading out, or attempting to read out, data from the data track of the spinning disk. High frequency signals detected by the optical pick-up unit 6 are signaled from the HF detector 16 to the processor unit 14 by means of a binary HF detection signal 18.

Figure 2:
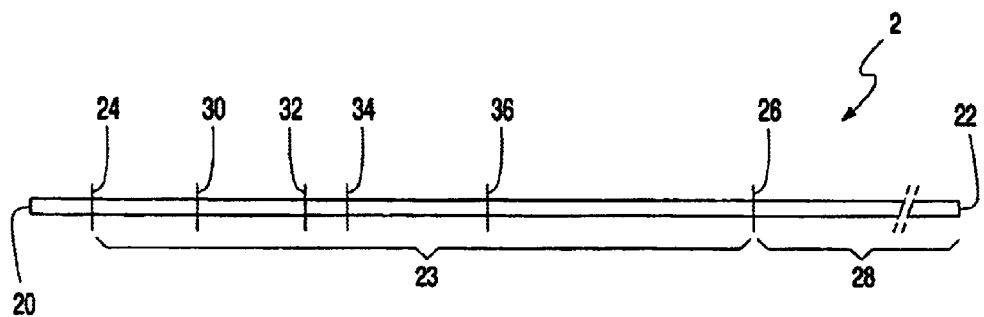
FIG. 2 is a schematic illustration of selected areas of a CD-R.

Referring now to FIG. 2, an unfinalized CD-R is shown in cross-section between an inner periphery 20 of the disk and an outer periphery 22 of the disk. A recorded area 23 is located between a known start location 24 and an unknown end location 26. The PMA (not shown) is located between the inner periphery 20 and the start location 24. The recorded area 23 includes one or more playback tracks separated by track boundaries. Outside the end 26 of the recorded area, an unrecorded area 28 exists in which only a pre-groove exists. In contrast, in the recorded area 23, a data track exists, the data track consisting of unerasable binary data markings, previously written onto the CD-R by a CD-R writer, which are coincident with the pre-groove in the recorded area 23.

The data track is in the form of a spiral, and includes both playback data and sub-code data. The sub-code data includes, in what is referred to as a Q channel, absolute time information which runs over playback track boundaries and which indicates a playing time within the entire recorded area 23, and relative time information, which indicates the playing time within the current playback track. In FIG. 2, five individual playback tracks are indicated, the first spanning between the start of the recorded area 24 and a first track boundary 30. The second, third and fourth playback tracks span the first track boundary and a second, third and fourth track boundary 32, 34, 36, respectively. The last playback track, the fifth track in this example, spans the fourth track boundary 36 and the end 26 of the recorded area 23.

In the following description of the scanning procedures used to build up index information, it should be noted that the motor 12 is controlled according to a normal random access read-out process, to ensure that the disk is spinning at a required estimated linear velocity appropriate to the radial location as the optical scan is performed.

Figure 3:
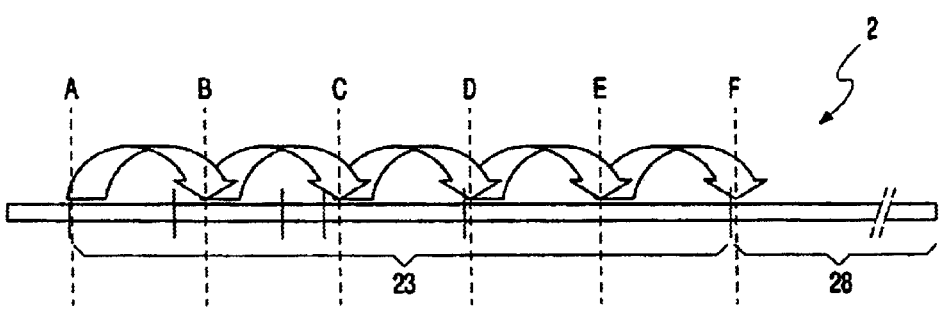
FIG. 3 is a schematic illustration of a coarse scanning method used by the apparatus of the present invention.

A first, coarse, scanning process used by the apparatus illustrated in FIG. 1 is illustrated in FIG. 3. In this process, a scan is initiated from the start 24 of the recorded area 23. The CD player 4 is capable of performing random access, by jumping (i.e. moving the sledge 8) to a radial location at which it is estimated that the desired absolute time in the recorded area is to be found. Such jumps are performed with predetermined intervals during this coarse scanning process, until the unrecorded area 28 is detected.

The unrecorded area 28 is detected by the HF detector 16. The use of the HF detector 16 provides increased speed of detection of the unrecorded area compared to waiting for a signal to be sent from the HF decoder 10 to the processor 14 indicating no data is present, whereby one or more attempts to read out data from the disk are required. Instead, an HF signal is detected by scanning along the data track while the disk is spinning, to indicate the presence of the data track. In the unrecorded area 28, on the other hand, due to the absence of the data track, no HF signal is detectable, and a binary signal appropriate to the presence or absence of the HF signal is sent by the HF detector 16 to the processor 14.

In this example, the predetermined intervals used throughout the coarse scanning are equal, and are set at approximately the order of two minutes of playing time each (approximately the average track time of a CD-R). However, it may be desirable to use initially larger, but gradually decreasing, predetermined intervals across the recorded area, to increase the speed of the scanning process in view of the increased likelihood of finding the approximate end of the recorded area as the amount of possible recorded area decreases.

In the coarse scanning method illustrated in FIG. 3, the optical pick-up unit 6 of the CD player 4 is first moved to the known starting point of the recorded area (which is prescribed in the "red book"), at an absolute timing in the recorded area of 0:0:0, or slightly more (e.g. one second more) to allow for errors in the estimated positioning of the optical pick-up unit. Next, the optical pick-up unit 6 is jumped with a predetermined interval to a position B (an estimated absolute time of 2:0:0 minutes), and an output from the pick-up unit is processed by the HF detector 16.

At position B, in the example illustrated in FIG. 3, an HF signal is detected, and therefore the CD player 4 continues to perform the set-up controls necessary to read out data from the data track, and then reads out index information, including the track number and the relative time within the track, from the sub-code data in the data track. Once the index information has been read out, a further predetermined interval jumps to position C (an absolute time estimated at 4:0:0 minutes) and subsequently to positions D and E (absolute times estimated at 6:0:0 and 8:0:0 minutes, respectively) are performed. In each of these radial positions the signal from the HF detector initially confirms that the position accessed is within the recorded area, and subsequently the index information is read out from the sub-code data. A fourth predetermined interval jump to position F (absolute time estimated at 10:0:00 minutes) is then carried out, and when the information is attempted to be read out from a data track, the HF detection signal 18 indicates that the present position is outside the recorded area. Accordingly, no attempt is made to read out index information at position F. Once position F has been reached, it is known that the location of the end 26 of the recorded area is between the last access position (position E) at which the recorded area was detected and the first access position (position F) where the unrecorded area 28 was detected. Accordingly, once the unrecorded area 28 is first detected, the CD player proceeds to a fine scanning mode, in which the end 26 of the recorded area 23 is detected with greater accuracy. In this mode, jump intervals are decreased to be smaller than the largest intervals in the coarse scanning mode (it is possible that one or more relatively small jumps may be made in the coarse scanning mode). In a fine-scanning algorithm used in this embodiment, the optical pick-up 6 is first jumped back to the last known position in the recorded area (position E), and from that position, jumped forwards by half of the predetermined interval used in the coarse scan. In this example, the jump forward from position E is therefore an estimated one minute jump forward. If the recorded area 23 is detected at the jumped-to position, a further jump forward is carried out at half of the previous jump forward, thereby locating the end 26 of the recorded area 23 to even greater accuracy. On the other hand, if the unrecorded area 28 is detected in the jump forward, the optical pick-up 6 is returned to the last known position in the recorded area (position E), and a further jump forward, at half the previous jump forward, is performed. This process is conducted iteratively, gradually reducing the jump size, until the position of the end 26 of the recorded area is located to a desired degree of accuracy (preferably, the degree of accuracy is to within at least half a second of the total playing time).

In the above-described fine scanning process, the last known position in the recorded area is jumped back to when the unrecorded area 28 is detected. The reason for this is that, although theoretically a jump to halfway between the position in which the unrecorded area 28 is detected and the last known position in the recorded area would provide a quicker algorithm, it has been found that two subsequent access attempts within the unrecorded area, which is possible according to such a half jump back, can cause the servo control of the motor to become unreliable. Reestablishing servo control of the motor 12 is time-consuming. Therefore, the fine scanning algorithm is designed to ensure that any access into the unrecorded area 28 is immediately followed by an access to a known part of the recorded area to maintain servo control of the motor.

In the above-described fine scanning mode, iterative and gradually smaller jumping is carried out in order to determine the location of the end of the recorded area to within a predetermined degree of accuracy. The degree of accuracy may be further improved by operating the CD player in normal playback mode, and at normal playback speed, continuously from the most outward position in which the recorded area has been detected during the jump scanning processes, to read out the sub-code data until the unrecorded area 28 is reached, at which point the end 26 of the recorded area is detected to a high degree of accuracy. Such continuous playback may be carried out, in order to scan the recorded area 23 at the approximate end of the disk, instead of the above-described fine jump scanning algorithm entirely. Alternatively, the above-described fine jump scanning algorithm may be carried out to determine the location of the end of the recorded area to a predetermined degree of accuracy, such as to within half a second of the total playing time, followed by the continuous playback process whereby the end of the recorded area is determined to an even greater degree of accuracy. Thereby, in the worst case the added scan time due to the continuous playback process is only half a second whilst the end of the recorded area is determined with high accuracy. The choice between whether or not the fine jump scanning algorithm method is used, and to what degree, depends on the relative timing benefits of the two fine scanning processes. In any case, both fine-scanning processes can be used to provide a high degree of accuracy in the location of the end of the disk, since in both processes, the disk is scanned along the data track.

Figure 4:
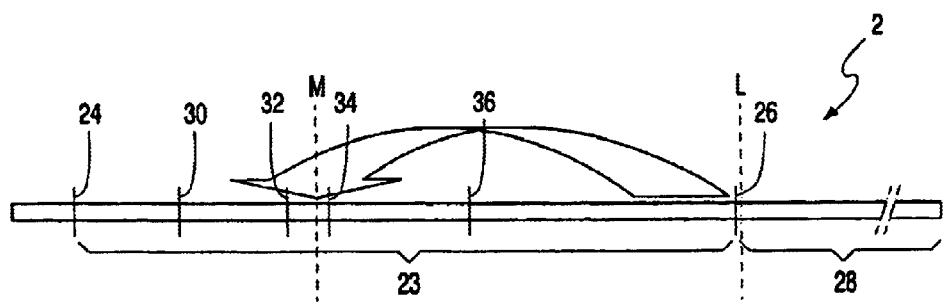
FIG. 4 is a schematic illustration of a scanning step in which missing index information is detected by apparatus in accordance with the present invention.

Referring now to FIG. 4, once the end of the recorded area 23 has been determined to a desired degree of accuracy, and the absolute time at the end of the recorded area is stored along with the other index information thus far detected the missing parts of the index information are detected. The coarse scanning process described in relation to FIG. 3 above, in the particular example shown, identified the position of the first track boundary 30 (by means of the relative time within the second track detected at position B), the third track boundary 34 (by means of the relative time within the fourth track detected at position C) and the fourth track boundary 36 (by means of the relative time within the fifth track detected at either of positions D or E). However, the position of the second track boundary 32 was not detected. By analysing the track numbers, it is possible for the apparatus to determine for which of the playback tracks index information is missing. In the example shown, the index information for playback track 3 is missing. However, the end time (corresponding to the third track boundary 34) of the track is known. Therefore, a further jump is performed from the final position of the fine scanning process (position L) to a position within the third track (position M). Since the "red book" standard specifies that a track should have a length of at least four seconds including any pre-gap, it is preferred that a location within one to three seconds of a known track boundary (in this case the third track boundary 34) is accessed. This ensures that the missing index information from the correct track accessed immediately even though the length of that track is unknown. Such a jump-back access is performed for each playback track for which index information is missing, in reverse order.

Once the coarse scanning process, the fine scanning process and the missing index information scanning process are carried out, the total playing time in the recorded area is known to a desired degree of accuracy along with the remaining index information necessary to play back the unfinalized CD-R disk 2.

Various alternatives are envisaged in relation to the above-described embodiment.

In the described embodiment, index information is detected during the scanning process in which the end of the track is located. Alternatively, all index information, other than the location of the end of the recorded area, may be detected solely in a missing index information scanning process, similar to that described above, following the detection of the end of the recorded area.

In the described embodiment, an HF detector is used to detect a jump into the unrecorded area. Alternatively, the servo control of the motor may be used to detect the unrecorded area. Namely, when the speed of the motor exceeds a predefined range appropriate to the radial location at which a random access read attempt is made, this may be detected to indicate that the unrecorded area has been reached. Further alternatively, the lack of data output from the decoder 10 after a predefined period following the start of a random access read attempt may also be detected to indicate the unrecorded area having been reached. However, both of these alternatives are considered less desirable insofar as the time taken to locate the end of the recorded area, even approximately, is increased.

In the described embodiment, a coarse scanning method is used in which random access jumps are employed. Alternatively, the continuous radial HF scanning method described in U.S. Pat. No. 5,351,226, cited supra, may be employed as the coarse scanning method to locate the end of the recorded area approximately, followed by a fine scanning method similar to that described above.

The invention may be implemented not only in conventional CD players, but also may be usefully employed in other data-carrying disk playback apparatus, including CD-R reader/writer apparatus. The scanning method, whereby build up of index information is performed, can also be usefully employed in cases where any data carrying disk is damaged in some way such that index information cannot be read, whether from a TOC area, a PMA area or another area. The invention may also be usefully employed in the reading of unfinalized CD-rewritable (CD-RW) disks, by means of conventional CD players which are unable to read a PMA area thereof.

Further modifications and variations may also be employed by the person skilled in the art without departing from the scope of the present invention, which is defined in the accompanying claims.

What is claimed is:

1. An apparatus for reproducing information from data-carrying discs having recorded areas of varying size, wherein the apparatus comprises:

high frequency detector means to determine, depending on a signal produced during scanning, whether and area of the disc being scanned has previously been recorded; and scanning means arranged to:

scan a disc coarsely during a coarse scanning to detect the end of a recorded area approximately, depending on the previous recording determination; and scan the disc finely during a fine scanning in the area of the detected approximate end, to detect the end of the recorded area with greater accuracy; and wherein:

the scanning means is arranged to jump across the disc, at selected intervals of the disc, during the coarse scanning; the scanning means is arranged to read out a sub-code at the selected intervals, in order to detect index information for the disc, said index information comprising recorded area start points and total playing time of the recorded area; and the scanning means in arranged to analyze the detected index information, to iteratively decrease, in each iteration of said fine scanning, the size of the jump according to the detected index information during the fine scanning, to jump to an area in which missing parts of the index information are judged to exist as a result of the analysis, and to read out a sub-code in the jumped to area indicative of the missing parts of the index information.

2. Apparatus according to claim 1, wherein the discs carry data in recorded data tracks, and the scanning means is arranged to scan along a data track during the coarse and/or the fine scanning.

3. Apparatus according to claim 1, wherein the selected intervals are predetermined throughout the coarse scanning.

4. Apparatus according to claim 1, wherein the scanning means is arranged to jump across the disc in the area of the detected approximate end, to detect the presence or absence of the recorded area, at selected intervals of the disc during the fine scanning step, the intervals used during the fine scanning being smaller than the largest intervals used during the coarse scanning.

5. Apparatus according to claim 4, wherein the jump intervals used during the fine scanning generally decrease during the fine scanning.

6. Apparatus according to claim 5, wherein the jump intervals used during the fine scanning decrease until a position at the end of the recorded area in located to a predetermined degree of accuracy.

7. Apparatus according to claim 1, wherein the scanning means is arranged during the fine scanning to detect a part of the recorded area which is the close to the end of the recorded area, jump from the close part in the direction of the end of the recorded area to a jumped-to-part, and if the recorded area is not found in the jumped-to-part, to jump from the jumped-to-part in the direction of the closest part.

8. Apparatus according to claim 1, wherein the scanning means is arranged to scan along a data track during the fine scanning.

9. Apparatus according to claim 8, wherein the scanning means is arranged to scan continuously along a data track, in the area of the detected approximate end, during the fine scanning until the end of the recorded area is detected.

10. The apparatus according to claim 1, wherein:
the discs carry data in recorded data tracks, and the scanning means scan the disc along a data track during at least one of the coarse and the fine scanning;
the scanning means jump the scanning across the disc, to detect the presence or absence of previous recording at selected intervals of the disc, during the coarse scanning;
the selected intervals are predetermined throughout the coarse scanning;
the scanning means read out a sub-code at the selected intervals, in order to detect index information for the disc;
the scanning means analyze the detected index information, and jump the scanning to an area in which missing parts of the index information are determined to exist by the scanning means, and read out a sub-code in the jumped-to area indicative of the missing parts of the index information;
the scanning means jump the scanning across the disc in the area of the detected approximate end, to detect the presence or absence of previous recording, at selected intervals of the disc during the fine scanning step, the intervals used during the fine scanning being smaller than the largest intervals used during the coarse scanning;

the jump intervals used during the fine scanning generally decrease during the fine scanning;
the jump intervals used during the fine scanning decrease until a position at the end of the recorded area is located to a predetermined degree of accuracy;
the scanning means during the fine scanning detect a part of the recorded area which is close to the end of the recorded area, to jump from the part in the direction of the end of the recorded area to a jumped-to-part, and if the recorded area is not found in the jumped-to-part, to jump from the jumped-to-part in the direction of the closet part;
the apparatus include a high frequency detector, whereby the presence or absence of previous recording is detected depending on a signal produced during scanning;
the scanning means scan along a data track during the fine scanning;
the scanning means scan continuously along a dark track, in the area of the detected approximate end, during the fine scanning until the end of the recorded area is detected.

11. An apparatus for reproducing information from data-carrying discs having recorded areas of varying characteristics, wherein the apparatus comprises:
a high frequency detector apparatus to determine, depending on a signal produced during scanning, whether an area of a disc being scanned has previously been recorded; and
scanning apparatus for reading out data from the recorded area of a disc in order to detect index information for the disc, said index information comprising recorded area start points and total playing time of the recorded area, the scanning apparatus being arranged to:
jump across a disc with predetermined intervals during a coarse scanning, read out data at the predetermined intervals to detect partial index information for the disc, analyze the partial index information, iteratively decrease in each iteration of said fine scanning, the size of the jump according to the detected index information during a fine scanning, jump to an area in which missing parts of the index information are judged to exist as a result of the analysis, and read out data in the jumped to area, wherein said data is indicative of the missing parts of the index information.

12. Apparatus according to claim 11, wherein the size of the recorded area is still to be detected whilst the scanning apparatus jumps across the disc with the predetermined intervals.

13. Apparatus according to claim 11, wherein the apparatus further comprises means for reading out stored index information from an index information area on data-carrying discs, and the scanning means is arranged to operate in response to detection by the apparatus that the stored index information is not present or unreadable.

14. The apparatus according to claim 11, wherein:
the discs carry data in recorded data tracks, and the scanning means scan the disc along a data track during at least one of the coarse and the fine scanning;
the scanning means jump the scanning across the disc, to detect the presence or absence of previous recording at selected intervals of the disc, during the coarse scanning;
the selected intervals are predetermined throughout the coarse scanning;

the scanning means read out a sub-code at the selected intervals, in order to detect index information for the disc;

the scanning means analyze the detected index information, and jump the scanning to an area in which missing parts of the index information are determined to exist by the scanning means, and read out a sub-code in the jumped-to area indicative of the missing parts of the index information;

the scanning means jump the scanning across the disc in the area of the detected approximate end, to detect the presence or absence of previous recording, at selected intervals of the disc during the fine scanning step, the intervals used during the fine scanning being smaller than the largest intervals used during the coarse scanning;

the jump intervals used during the fine scanning generally decrease during the fine scanning;

the jump intervals used during the fine scanning decrease until a position at the end of the recorded area is located to a predetermined degree of accuracy;

the scanning means during the fine scanning detect a part of the recorded area which is close to the end of the recorded area, to jump from the close part in the direction of the end of the recorded area to a jumped-to-part, and if the recorded area is not found in the jumped-to-part, to jump from the jumped-to-part in the direction of the closest part;

the apparatus include a high frequency detector, whereby the presence or absence of previous recording is detected depending on a signal produced during scanning;

the scanning means scan along a data track during the fine scanning;

the scanning means scan continuously along a data track, in the area of the detected approximate end, during the fine scanning until the end of the recorded area is detected.

15. An apparatus for reproducing information from the data-carrying discs having recorded areas of varying size, wherein the apparatus comprises:

a high frequency detector, whereby the presence or absence of previous recording in an area being scanned is detected depending on a signal produced during scanning; and scanning means arranged to:
  scan a disc coarsely during a coarse scanning to detect the end of a recorded area approximately, depending on the high frequency detector; and
  scan the disc finely during a fine scanning in the area of the detected approximate end, using fine scanning jumps whose size is iteratively decreased according to detected index information, said index information comprising recorded area start points and total playing time of the recorded area, to detect the end of the recorded area with greater accuracy.

16. Apparatus according to claim 15, wherein:

the discs carry data in recorded data tracks, and the scanning means scan the disc along a data track during at least one of the coarse and the fine scanning;

the scanning means jump the scanning across the disc, to detect the presence or absence of previous recording at selected intervals of the disc, during the coarse scanning;

the selected intervals are predetermined throughout the coarse scanning;

the scanning means read out a sub-code at the selected intervals, in order to detect index information for the disc;

the scanning means analyze the detected index information, and jump the scanning to an area in which missing parts of the index information are determined to exist by the scanning means, and read out a sub-code in the jumped-to area indicative of the missing parts of the index information;

the scanning means jump the scanning across the disc in the area of the detected approximate end, to detect the presence or absence of previous recording, at selected intervals of the disc during the fine scanning step, the intervals used during the fine scanning being smaller than the largest intervals used during the coarse scanning;

the jump intervals used during the fine scanning generally decrease during the fine scanning;

the jump intervals used during the fine scanning decrease until a position at the end of the recorded area is located to a predetermined degree of accuracy;

the scanning means during the fine scanning detect a part of the recorded area which is close to the end of the recorded area, to jump from the close part in the direction of the end of the recorded area to jumped-to-part, and if the recorded area is not found in the jumped-to-part, to jump from the jumped-to-part in the direction of the closest part;

the scanning means scan along a data track during the fine scanning;

the scanning means scan continuously along a data track, in the area of the detected approximate end, during the fine scanning until the end of the recorded area is detected.

17. An apparatus for reproducing information from data-carrying discs having recorded areas of varying size, wherein the apparatus comprises scanning means arranged to:

scan a disc coarsely during a coarse scanning to detect, via a high frequency detector, the end of a recorded area approximately; and scan the disc finely in the area of the detected approximate end, via said high frequency detector, to detect the end of the recorded area with greater accuracy, using fine scanning jumps whose size is iteratively decreased, in each iteration of fine scanning, according to detected index information;

and wherein the apparatus further comprises means for reading out stored index information from an index information area on data-carrying discs, said index information comprising recorded area start points and total playing time of the recorded area, and the scanning means is arranged to operate in response to detection by the apparatus that the stored index information is not present or unreadable.

18. The apparatus according to claim 17, wherein:

the discs carry data in recorded data tracks, and the scanning means the disc along a data track during at least one of the coarse and the fine scanning;

the scanning means jump the scanning across the disc, to detect the presence or absence of previous recording at selected intervals of the disc, during the coarse scanning;

the selected intervals are predetermined throughout the coarse scanning;

the scanning means read out a sub-code at the selected intervals, in order to detect index information for the disc;

the scanning means analyze the detected information, and jump the scanning to an area in which missing parts of the index information are determined to exist by the scanning means, and read out a sub-code in the jumped-to area indicative of the missing parts of the index information;

the scanning means jump the scanning across the disc in the area of the detected approximate end, to detect the presence or absence of previous recording, at selected intervals of the disc during the fine scanning step, the intervals used during the fine scanning being smaller than the largest intervals used during the coarse scanning;

the jump intervals used during the fine scanning generally decrease during the fine scanning;

the jump intervals used during the fine scanning decrease until a position at the end of the recorded area is located to a predetermined degree of accuracy;

the scanning means during the fine scanning detect a part of the recorded area which is close to the end of the recorded area, to jump from the close part in the direction of the end of the recorded area to a jumped-to-part, and if the recorded area is not found in the jumped-to-part, to jump from the jumped-to-part in the direction of the closet part;

said high frequency detector detects a high frequency signal indicative of the presence or absence of previous recording, depending on a high frequency signal produced during scanning;

the scanning means scan along a data track during the fine scanning;

the scanning means scan continuously along a data track, in the area of the detected approximate end, during the fine scanning until the end of the recorded area is detected.

* * * * *